United States Patent [19]

Struyf

[11] Patent Number: 4,819,386
[45] Date of Patent: Apr. 11, 1989

[54] OPTIC FIBER SANDING FIXTURE AND METHOD OF USING

[75] Inventor: William H. Struyf, Des Moines, Iowa

[73] Assignee: Northwestern Bell Corporation, Omaha, Nebr.

[21] Appl. No.: 75,146

[22] Filed: Jul. 20, 1987

[51] Int. Cl.$^4$ .............................................. B24B 7/00
[52] U.S. Cl. ............................. 51/281 R; 51/217 R; 269/43; 269/287; 269/900
[58] Field of Search ..................... 51/109 R, 125, 128, 51/217 R, 217 S, 216 R, 216 LP, 210, 281 R, 283 R, 289 R, 277; 269/40, 43, 207, 287, 296, 900; 350/96.2

[56] References Cited

U.S. PATENT DOCUMENTS

| | | | |
|---|---|---|---|
| 2,558,966 | 7/1951 | Lane | 269/287 |
| 3,123,953 | 3/1964 | Merkl | 51/283 R |
| 3,588,081 | 6/1971 | Logan | 269/40 |
| 3,868,794 | 3/1975 | Zitkus | 51/216 A |
| 4,266,996 | 5/1981 | Garbe et al. | 156/154 |
| 4,330,965 | 5/1982 | Clark | 51/217 R |
| 4,384,431 | 5/1983 | Jackson | 51/34 E |
| 4,395,089 | 7/1983 | McKee | 350/96.2 |
| 4,492,060 | 1/1985 | Clark | 51/283 R |
| 4,498,260 | 2/1985 | Doty | 51/217 R |
| 4,539,776 | 1/1985 | Weaver, Jr. | 51/156 |
| 4,614,402 | 1/1986 | Caron et al. | 350/96.2 |
| 4,714,315 | 12/1987 | Krause | 350/96.2 |

OTHER PUBLICATIONS

"New Product Bulletin: Buehler Fiberpol Optical Fiber Polishing System" Buehler Fiber Optics Division, 41 Waukegan Road, Lake Bluff, Illinois, 1966, 2 pages.

Primary Examiner—Robert P. Olszewski
Attorney, Agent, or Firm—Christensen, O'Connor, Johnson & Kindness

[57] ABSTRACT

A fixture and method for mounting one or more optic fibers and attached ferrule assemblies transverse to an abrasive surface. The fixture includes a holder plate (12) having one or more boreholes (14) disposed in axial alignment adjacent a peripheral edge of the plate and connected thereto by laterally extending slots (16). An upper portion (18) of the boreholes is relatively smaller in diameter than a lower portion (20). The optical fiber (26) and ferrule assembly (28) is slid into the borehole through the slot, seated in place, and retained therein by a retainer plate (22) having an aligned borehole through which an end of the ferrule assembly extends. The helical coil spring (32) provides a bias force to urge the ferrule assembly (28) against the abrasive surface.

15 Claims, 3 Drawing Sheets

OPTIC FIBER SANDING FIXTURE AND METHOD OF USING

TECHNICAL FIELD

This invention generally relates to a fixture for sanding and/or polishing the ends of optic fibers and, specifically, to a fixture for mounting a plurality of optic fibers and ferrule assemblies for application against an abrasive surface.

BACKGROUND INFORMATION

Use of fiber optic cables for voice and data telecommunications has recently become quite prevalent. The low noise and greater bandwidth of fiber optics compared to metallic conductors has long been recognized as a major advantage; however, the labor required to fabricate an extensive fiber optic cable system for efficiently propagating voice and data modulated light signals is substantially greater than conventional conductors and has slowed the acceptance of the technology.

In constructing a fiber optic system, cables must be spliced together. Each splice in a fiber optic cable is accomplished by first gluing a ferrule assembly on the ends of two cables that are to be joined. Prior to adjoining the resulting optic fiber/ferrule assemblies in a butt connection, the cleaved rough end of each cable must be sanded with increasingly finer grit so that it is flat and transverse to the longitudinal axis of the cable. After final sanding, the ends of the fibers and ferrule assemblies are polished to remove any remaining minor irregularities and scratches. The ends of the two fiber/ferrule assemblies are then butt joined and secured in precise alignment by a sleeve that slides over a small diameter barrel portion of the ferrule and is glued in place. Failure to properly sand, polish and align the adjoined ends of the two fiber optic cables may result in light transmission losses in the connection sufficient to make the joint unacceptable.

Sanding and polishing the optical fiber/ferrule assemblies may be accomplished by individually lap sanding and polishing each assembly. In communication systems having thousands of fiber optic cable splices, sanding and polishing each assembly to the required precision would likely involve unacceptable labor costs and excessive time. Accordingly, machines have been developed to sand and polish forty or more optical fiber/ferrule assemblies at one time. In one such machine, the assemblies are each inserted into a holder, locked into place with a pneumatic clamp, and introduced against a rotating sanding or polishing surface at a controlled feed rate. The pneumatic clamping mechanism used in this machine requires a source of compressed air, is relatively complex in structure, and therefore, is comparatively expensive.

In consideration of the need for a relatively low cost machine to sand and/or polish a plurality of optical fiber/ferrule assemblies, it is an object of this invention to provide a fixture for holding such assemblies against an abrasive surface, which is simple in structure, relatively low in cost, and easy to use.

It is a further object of this invention to mount one or more optical fibers and attached ferrule assemblies in transverse alignment to an abrasive surface.

These and other objects and advantages of the subject invention will be apparent from the drawings and the disclosure of the preferred embodiment that follows hereinbelow.

SUMMARY OF THE INVENTION

A fixture and a method for supporting one or a plurality of optical fibers and attached ferrule assemblies in transverse alignment to an abrasive surface are disclosed and claimed as the present invention. The fixture comprises a holder plate having a plurality of spaced-apart boreholes extending therethrough in substantially parallel alignment, the boreholes being disposed adjacent to a perimeter of the holder plate and having a relatively smaller diameter at one end than the other. A shoulder is thus defined in each of the boreholes at an intermediate depth where their diameter changes.

Spaced apart along the perimeter of the holder plate are a plurality of slots, each slot being aligned with one of the boreholes and extending from the perimeter of the holder plate into the one borehole along its length. Lateral access for installation of one of the optical fiber and ferrule assemblies in each borehole is thereby provided through each of the slots.

Each ferrule assembly includes a helical coil spring through which the optical fiber is inserted during attachment of the ferrule assembly to the optical fiber. The helical coil spring serves to bias each optical fiber and ferrule assembly in an axial direction outwardly of the shoulder in each borehole and toward the abrasive surface. A retainer plate having a plurality of boreholes each aligned with one of the boreholes in the holder plate serves to retain the optical fibers and ferrule assemblies captive within the boreholes of the holder plate. Ends of the optical fibers and attached ferrule assemblies extend in a close fit through the boreholes in the retainer plate to abut the abrasive surface. A plurality of pins extend upright, perpendicular to one surface of the retainer plate and are fitted into corresponding apertures in the holding plate, sized to accommodate the pins. A sliding clip disposed on the holder plate engages a groove formed on one of the pins to hold the retainer plate juxtaposed against the holder plate.

In use, the optical fibers and attached ferrule assemblies are slid laterally into the boreholes in the holder plate through the slots and are held in place by the retainer plate. The fixture (and mounted optical fibers and ferrule assemblies) is then positioned by an operator against the abrasive surface, so that the extending ends of the optical fibers and attached ferrule assemblies are brought into contact with the abrasive surface, forcing the attached helical coil springs to be compressed against the shoulders inside the boreholes of the holder plate. Since the helical coil springs have generally common characteristics and are each compressed by approximately the same distance, they tend to exert an equal force in biasing the optical fibers and ferrule assemblies against the abrasive surface.

DISCLOSURE OF THE PREFERRED EMBODIMENTS

Figure 1:
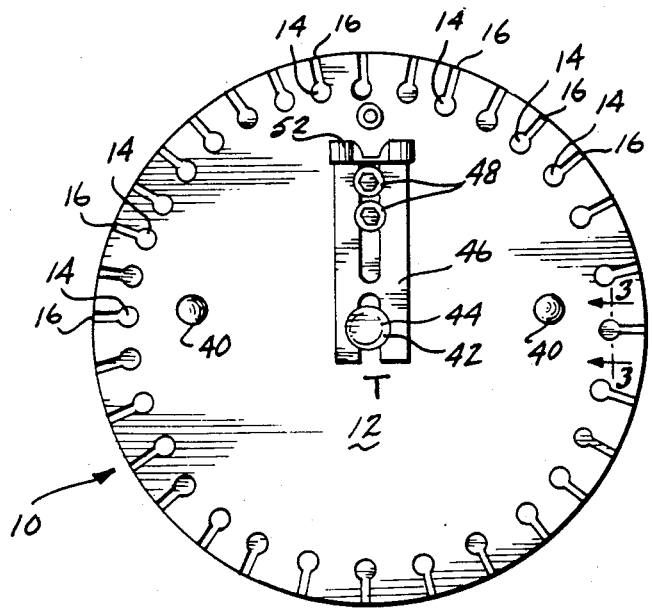
FIG. 1 is a plan view of the fixture used to mount the optical fiber and ferrule assemblies.

With reference to FIG. 1, a fixture comprising the present invention is generally denoted by reference numeral 10. Fixture 10 includes a disk-like holder plate 12 having a plurality of spaced-apart boreholes 14 extending therethrough in common axial alignment and inset from the circumference of holder plate 12. A plurality of radially aligned slots 16 connect each of boreholes 14 along their entire depth with the circumferential edge of holder plate 12, so that in combination, as viewed from each planar surface of holder plate 12, boreholes 14 and slots 16 appear keyhole shaped. Slots 16 thus provide lateral access from the peripheral edge of holder plate 12 into the interior of boreholes 14.

Figure 3:
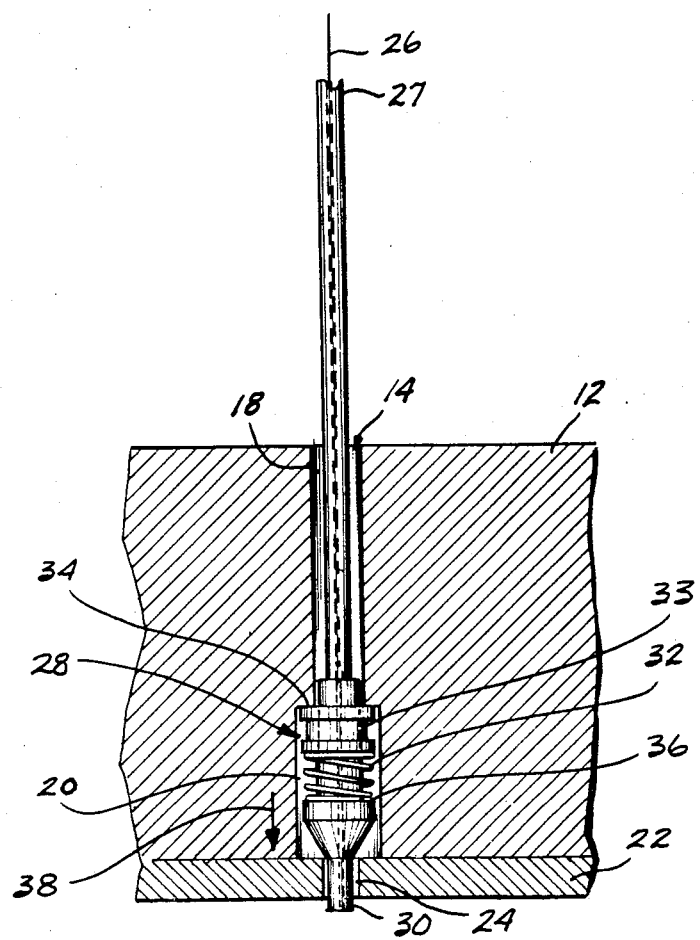
FIG. 3 is a cross-sectional view of the fixture showing an optical fiber and ferrule assembly mounted in place, taken along section lines 3-3 of FIG. 1.

As shown in FIG. 3, boreholes 14 include a small diameter portion 18 that extends from the top surface of holder plate 12 to an intermediate depth therein. Below the small diameter portion 18 of boreholes 14 is formed a large diameter portion 20, which extends from the intermediate depth at which the smaller diameter portion 18 terminates to the opposite planar surface of holder plate 12. A round retainer plate 22 is juxtaposed against this surface of holder plate 12 at which the larger diameter portions of boreholes 14 terminate. A plurality of boreholes 24 are disposed in retainer plate 22 each corresponding to and aligned with one of the boreholes 14.

Figure 2:
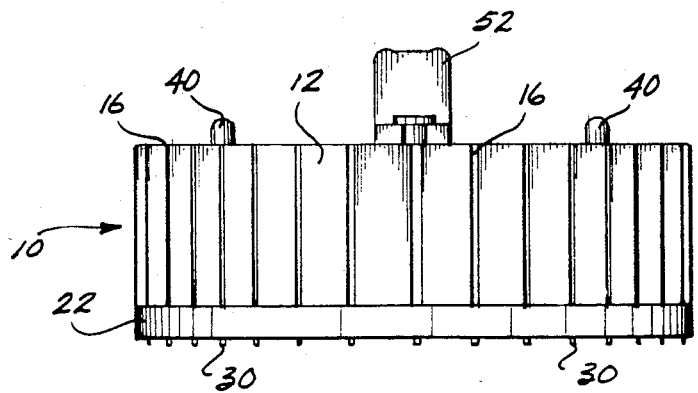
FIG. 2 is an elevational view of the fixture.

The cross-sectional view of FIG. 3 clearly illustrates the manner in which an optical fiber 26 having a sheath 27, and attached ferrule assembly 28 are retained within each of boreholes 14. The smaller diameter portion 18 of boreholes 14 is substantially larger in diameter than that of sheath 27. Further, the width of slots 16 (FIGS. 1 and 2) is sized slightly larger than the diameter of sheath 27. Slots 16 thus easily accommodate optical fibers 26 as they are laterally inserted into borehole 14. The lateral installation is accomplished by shifting the ferrule assemblies 28 below the bottom planar surface of holder plate 12 and sliding the optical fibers 26 radially inward, through slots 16 and into boreholes 14. Thereafter, ferrule assemblies 28 are positioned in the larger diameter portion 20 of boreholes 14 and seated so that a helical coil spring 32 and collar 33 disposed on the upper portion of each ferrule assembly 28 abuts a shoulder 34 defined in the holder plate 12 where the smaller diameter portion 18 of boreholes 14 changes to the larger diameter portion 20. The optical fibers 26 and attached ferrule assemblies 28 are held in place within boreholes 14 by retainer plate 22 which is positioned against the lower surface of holder plate 12 so that a sleeve receiver 30 disposed on the lower portion of each ferrule assembly 28 extends through borehole 24 in retainer plate 22. As retainer plate 22 is thus juxtaposed against holder plate 12, it abuts against ferrule assembly 28, slightly compressing helical coil spring 32 as collar 33 is backed against shoulder 34. Helical coil springs 32 continue to bias the optical fiber 26 and ferrule assembly 28 away from shoulder 34, causing sleeve receiver 30 to extend beyond the lower surface of retainer plate 22. It will be apparent that a plurality of optical fibers 26 and ferrule assemblies 28 can be retained in the other boreholes 14 in a manner similar to that shown for the single optical fiber and ferrule assembly illustrated in FIG. 3.

Referring again to FIGS. 1 and 2, three pins extend outwardly from the top surface of retainer plate 22, perpendicular thereto. The two most widely disposed pins 40, in conjunction with the centrally disposed pin 42, serve to align the boreholes 24 in retainer plate 22 with the boreholes 14 in holder plate 12. In addition, central pin 42 includes a groove subscribed about its circumference, at a height above the top surface of retainer plate 22 that is substantially equal to the thickness of holder plate 12. A slotted clip 46 is slidingly attached to the top surface of holder plate 12 using suitable bolts 48, and includes an upwardly extended grip portion 52 which may be grasped by the user between a thumb and forefinger to slide clip 46 into engagement with groove 44 on central pin 42. By thus engaging clip 46 with groove 44, retainer plate 22 is held tightly against the lower surface of holder plate 12, thereby retaining each of the optical fibers 26 and ferrule assemblies 28 within boreholes 14 as previously explained hereinabove. Alternatively, central pin 42 may be threaded, and a nut (not shown) tightened down against the top surface of holder plate 12 to secure retainer plate 22 against the lower surface of the holder plate. Other suitable means for attaching retainer plate 22 to holder plate 12 will be evident to those of ordinary skill in the art; however, clip 46 is a preferred mechanism to accomplish this function, since it permits retainer plate 22 to be quickly latched in place against holder plate 12.

Figure 4:
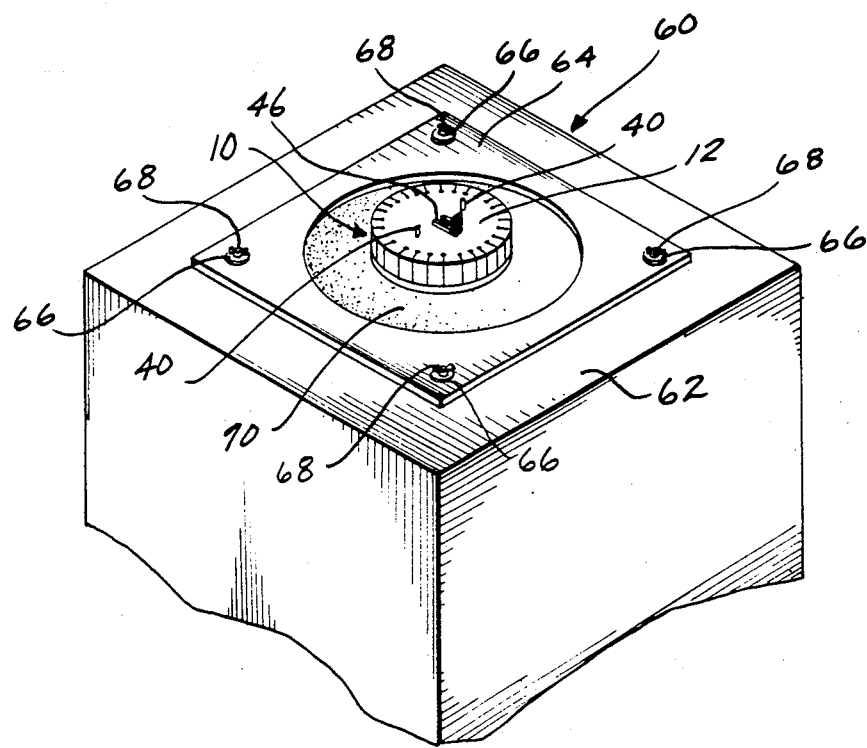
FIG. 4 is a perspective view showing the fixture resting on an abrasive surface of sanding/polishing machine, positioned as it would be for sanding or polishing a plurality of optical fibers and attached ferrule assemblies mounted therein.

Turning now to FIG. 4, fixture 10 is illustrated positioned for use on a sanding/polishing machine 60. An electric motor (not shown) is mounted inside sanding-/polishing machine 60, within an enclosure 62. The electric motor depends from a mounting plate 64 attached with bolts 68 and wing nuts 66 to the top surface of sanding/polishing machine 60. An abrasive wheel 70 is rotatably driven by the electric motor, and is easily changed to provide an abrasive surface of the desired grit size for either sanding or polishing optical fibers 26 and ferrule assemblies 28. A plurality of such optical fibers and ferrule assemblies are mounted within fixture 10 as explained hereinabove. Fixture 10 is then manually positioned by an operator as shown in FIG. 4, so that the extending ends of the optical fibers 26 and ferrule assemblies 28 are brought into contact with the rotating wheel's abrasive surface. Water is used to lubricate abrasive wheel 70 and any excess is absorbed by a sponge (not shown) disposed inside sanding/polishing machine 60.

As the sleeve receiver 30 of each ferrule assembly 28 (and the inner optical fiber 26) contact the abrasive wheel 70, the helical coil spring 32 is compressed until the sleeve receiver is flush with the lower surface of retainer plate 22. This condition occurs when retainer plate 22 contacts abrasive wheel 70. Helical coil springs 32 are compressed by about the same amount and thus provide a predefined bias force 38 which urges the optical fibers 26 and ferrule assemblies 28 against the abrasive surface of wheel 70. Force 38 is approximately equal for each of the optical fibers 26 and ferrule assemblies 28, since helical coil springs 32 have approximately equal spring coefficients and because springs 32 are equally compressed, as noted above. Transverse alignment of boreholes 14 relative to the surface of abrasive wheel 70 ensures that the ends of the optical fibers 26 are sanded and/or polished flat and in transverse alignment to their longitudinal axis.

Fixture 10 can also be attached to a supporting arm (not shown) affixed to sanding/polishing machine 60. The supporting arm would hold the fixture in lieu of the operator and might be mechanically driven to reciprocate fixture 10 over the abrasive surface of wheel 70.

Holder plate 12 may be provided with boreholes 14 and slots 16 in sufficient quantity to mount a desired number of optical fibers 26 and ferrule assemblies 28. Further, the relative diameter and depth of the small diameter portion 18 and the large diameter portion 20 of boreholes 14 may be modified as required to accommodate a specific diameter optical fiber 26 and a specific configuration of ferrule assembly 28. These and other modifications to the preferred embodiment will be apparent to those of ordinary skill in the art.

Although the subject invention has been disclosed with respect to a preferred embodiment and modifications thereto, it is not intended that the invention be limited by the disclosure or by such modifications, but instead that its scope should be determined entirely by reference to the claims which follow hereinbelow.

The embodiments of the invention in which an exclusive property or privilege is claimed are defined as follows:

1. A fixture adapted to hold an optical fiber and an attached ferrule in transverse alignment with an abrasive surface comprising:
   a plate having a borehole extending therethrough along a longitudinal axis, the borehole including a first and a second section lying along the longitudinal axis with the first section sized to accommodate the ferrule assembly, a diameter of the first section being substantially greater than that of the second section;
   an edge of the plate including a slot that opens into the borehole along its entire length thereby providing lateral access to the borehole from the edge of the plate, the slot having width at least equal to the diameter of the second section but less than the diameter of first section; and
   a retainer removably affixed to the plate and including a borehole having a longitudinal axis that is aligned with the longitudinal axis of the borehole in the plate and overlying the first section thereof, the borehole in the retainer having a diameter substantially smaller than the diameter of the first section, but sized to accommodate in a close fit an end of the attached ferrule and the enclosed optical fiber.

2. The fixture of claim 1, further comprising a shoulder defined at an inner end of the first section where it adjoins the second section, a spring disposed on the ferrule acting on said shoulder so as to bias the optical fiber and the attached ferrule in the axial direction, toward the abrasive surface.

3. The fixture of claim 2, wherein compression of the spring by a predetermined increment as an end of the optical fiber and ferrule contacts the abrasive surface, defines a predetermined sanding force, said increment being determined by the disposition of the shoulder along the longitudinal axis of the borehole.

4. The fixture of claim 1, wherein the retainer plate includes a substantially planar surface which is transverse to the longitudinal axis of the plate borehole and to the retainer plate borehole, the end of the ferrule extending through the retainer plate borehole to contact the abrasive surface as it moves parallel to the substantially planar surface of the retainer plate.

5. A method for mounting an optical fiber and an attached ferrule assembly for sanding an end of the optical fiber and the ferrule assembly on an abrasive surface, comprising the steps of:
   inserting the optical fiber laterally through a slot formed in an edge of a mounting plate and into a borehole extending through the plate;
   sliding the attached ferrule assembly into the borehole, thereby seating the ferrule assembly inside the borehole;
   biasing the optical fiber and ferrule assembly with a force directed outwardly from a shoulder formed in the borehole;
   retaining the optical fiber and ferrule assembly within the borehole using an overlying cover plate having a borehole through which extends an end of the optical fiber and ferrule assembly; and
   affixing the mounting plate adjacent the abrasive surface so that the biasing force causes the extending end of the optical fiber and ferrule assembly to abut the abrasive surface.

6. The method of claim 5, wherein a plurality of other optical fibers and ferrule assemblies are mounted in a plurality of other boreholes that are spaced apart around the circumference of the mounting plate, each of the other boreholes being provided with a laterally extending slot, and each of the other optical fibers and ferrule assemblies being retained by the cover plate, an end of each of the other optical fibers and ferrule assemblies extending through other boreholes disposed in the cover plate to abut the abrasive surface.

7. The method of claim 5, wherein a helical spring is used to bias the optical fiber and ferrule assembly outwardly of the borehole.

8. The method of claim 5, wherein the step of affixing the mounting plate comprises the step of manually holding the mounting plate and cover plate with the end of the retained optical fiber and ferrule assembly in contact with the abrasive surface.

9. The method of claim 5, wherein the mounting plate includes a slide lock assembly adapted to engage a groove in a retainer pin affixed to the cover plate, the step of retaining the optical fiber and ferrule assembly comprising the step of engaging the groove in the retaining pin with the slide-lock assembly.

10. A fixture for supporting a plurality of optical fibers and attached ferrule assemblies in common transverse alignment with an abrasive surface, said ferrule assemblies each including a bias spring, the fixture comprising:
   a holder plate having a plurality of spaced-apart boreholes extending therethrough in substantially parallel alignment, the boreholes being disposed adjacent to a perimeter of the holder plate and having a relatively smaller diameter at one end than at the other, a shoulder thus being defined in the boreholes at an intermediate depth where the diameter changes;
   a plurality of slots spaced-apart along the perimeter of the holder plate, each slot being aligned with one of the boreholes and extending from the perimeter of the holder plate into the one borehole along its length, thereby providing lateral access for installation of one of the optical fibers and ferrule assemblies in each borehole, said bias springs acting against the shoulders to bias the optical fibers and ferrule assemblies in an axial direction, outwardly of the shoulder in each borehole and toward the abrasive surface; and means for retaining the optical fibers and ferrule assemblies captive within the boreholes.

11. The fixture of claim 10, wherein the holder plate is a round disk.

12. The fixture of claim 10, wherein the means for retaining the optical fibers and ferrule assemblies captive within the boreholes comprise a retainer plate having a plurality of boreholes, each aligned with one of the boreholes in the holder plate, a diameter of each of the boreholes in the retainer plate being sized to accommodate in a close fit an end of the optical fiber and the attached ferrule assembly that extends therethrough to abut the abrasive surface.

13. The fixture of claim 12, wherein the retainer plate includes one or more pins extending outwardly perpendicular to one surface, and wherein the holder plate includes one or more corresponding apertures sized to accommodate the one or more pins, the means for retaining the optical fibers and ferrule assemblies captive further comprising a groove disposed on the one or more pins, and a sliding clip disposed on the holder plate and adapted to engage the groove to hold the retainer plate juxtaposed against the holder plate.

14. The fixture of claim 10, wherein the slots are sufficiently wide so that the optical fibers may be inserted laterally, but are too narrow to accommodate passage of the ferrule assemblies.

15. The fixture of claim 14, wherein the slots and the boreholes define generally keyhole-shaped passages through the holder plate when viewed from an end of the boreholes.

* * * * *